United States Patent [19]

Ritchey

[11] 3,916,904

[45] Nov. 4, 1975

[54] TAG INSERTING TOOL
[76] Inventor: Eugene B. Ritchey, Rte. 3, Box 58, Brighton, Colo. 80601
[22] Filed: Apr. 1, 1974
[21] Appl. No.: 456,534

[52] U.S. Cl. .................................. 128/330; 40/301
[51] Int. Cl.² ...................... A61B 17/00; G09F 3/00
[58] Field of Search .......................... 128/304–316, 128/329–330, 333, 347; 40/300–302; 81/1 R, 1 N, 52.35, 15.7; 93/87; 27/24 A; 111/4; 119/135; 29/235, 241, 243.5, 432, 505; 227/31; 223/99, 102–105; 30/16, 119, 151, 168, 286, 340, 280, 314, 315, 366

[56] References Cited
UNITED STATES PATENTS

| | | | |
|---|---|---|---|
| 564,581 | 7/1896 | Baker | 27/24 A |
| 2,250,237 | 7/1941 | Schartzkopf | 30/332 |
| 2,541,691 | 2/1951 | Eicher | 27/24 A |
| 2,713,863 | 7/1955 | Handerson | 128/330 |
| 3,334,434 | 8/1967 | Melin | 40/301 |
| 3,512,289 | 5/1970 | Hayes | 128/330 |
| 3,552,051 | 1/1971 | Ritchey | 40/301 |
| 3,675,357 | 7/1972 | Magee | 40/300 |

Primary Examiner—Richard A. Gaudet
Assistant Examiner—Rick Opitz
Attorney, Agent, or Firm—Sheridan, Ross & Fields

[57] ABSTRACT

The tool has a slender elongate flat shank with an enlarged head at its forward end, the head being formed with a piercing point, a first sleeve secured to the forward end of the shank, and a second sleeve slidable on the rearward portion of the shank. The second sleeve is smaller than the first sleeve so that it can slide within the first sleeve to define a short tubular pocket for releasably receiving an anchoring head of a tag having a large marking panel connected to the head by a narrow neck.

7 Claims, 11 Drawing Figures

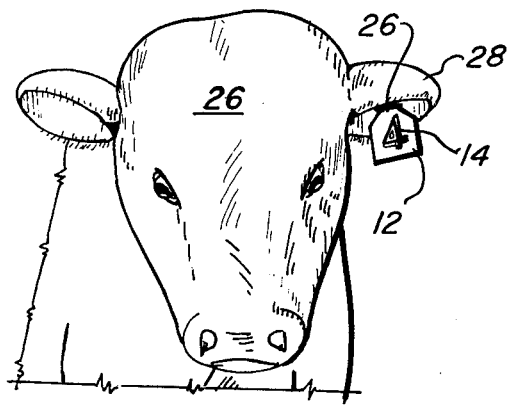
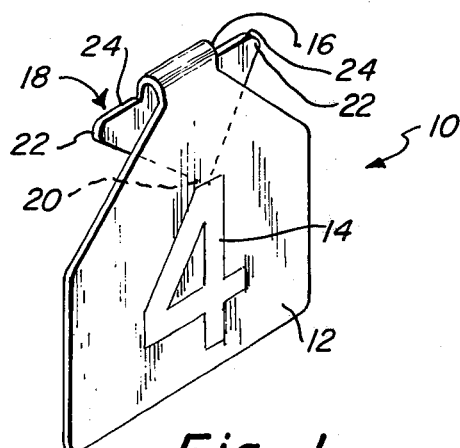
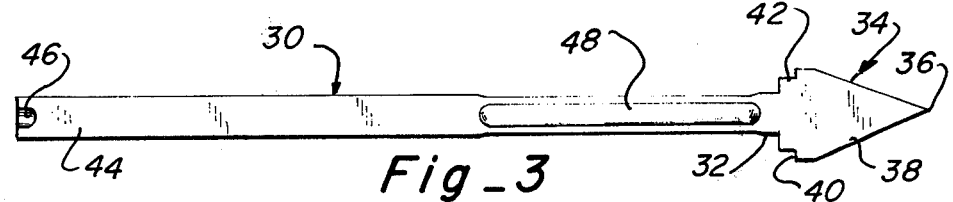
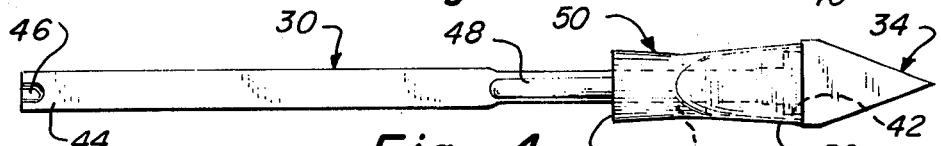
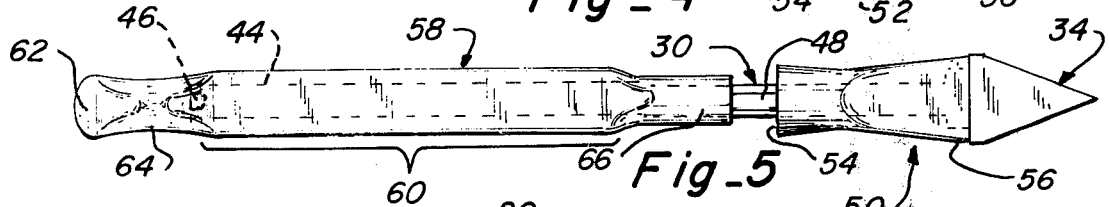
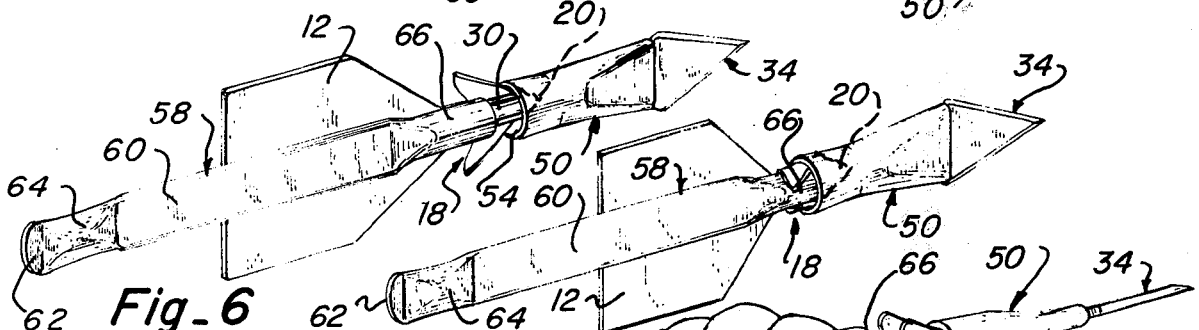
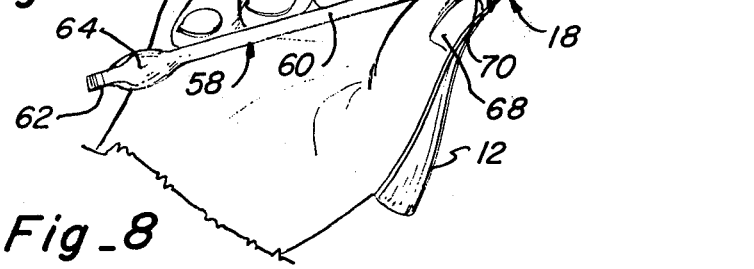

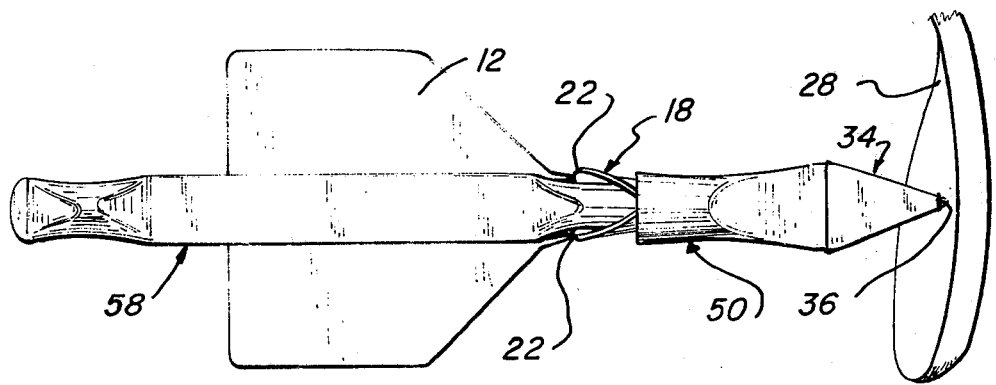
Fig_9
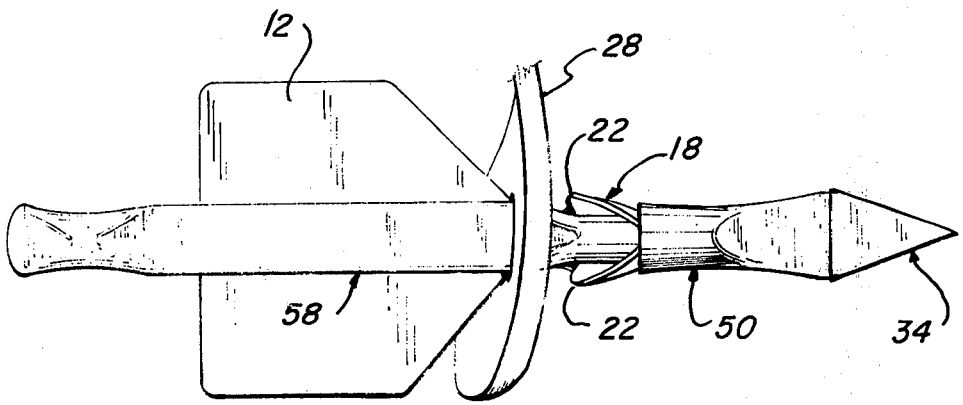
Fig_10
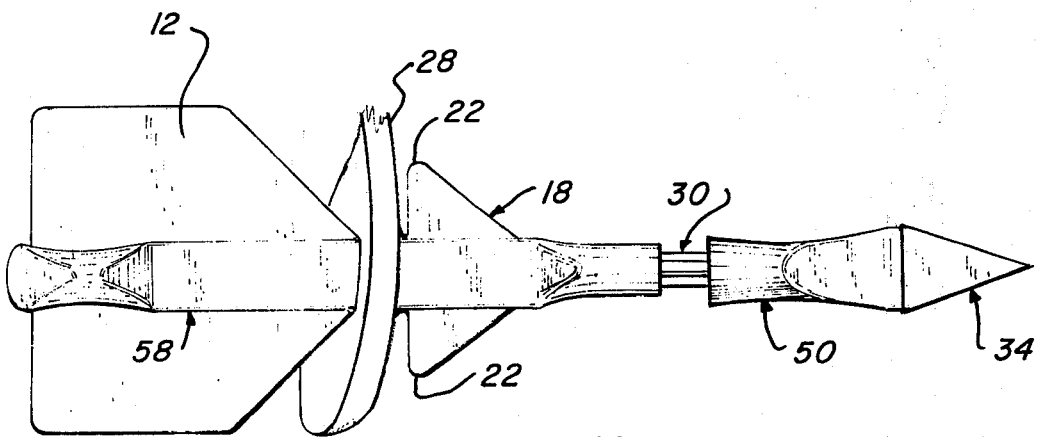
Fig_11

TAG INSERTING TOOL

BACKGROUND OF THE INVENTION

This invention lies in the field of tools for applying tags to various elements and is particularly directed to such tools for inserting tags in the ears or other tissue of animals such as cattle or sheep. Such tags may be marked in various ways to indicate identity, or ownership, or classification of any type.

Tags of various kinds have been used for many years to accomplish the purposes mentioned above and widely differing tools have been used for applying them. Some tags have been made of metal and formed in one or more pieces which were fastened together by clinching after piercing an aperture through the ear. Most of them were formed into loops which had a tendency to catch on bushes, fence wires, etc., causing them to be torn off or to injure the animals.

A superior tag for the purpose is disclosed in U.S. Pat. No. 3,552,051 to Eugene B. Ritchey. This tag is molded or stamped from a flat sheet of resilient elastomeric material and includes a laterally extensive marking panel, a narrow neck, and an anchoring head having the general planform of an arrow head with a narrow leading end and rearwardly diverging wings. To apply this tag, the head is rolled up as tightly as possible about a fore and aft axis and the head is inserted into the aft end of a tubular applying tool having a piercing point at its forward end. The tool is then pushed through the ear and gripped on the remote side to pull it entirely through the ear and away from the anchoring head. The wings extend on the remote side and anchor the tag, leaving the panel exposed on the first side.

While the tag is very satisfactory, the combination of tag and tool does have a disadvantage. The material of the tag is very tough and has a strong resistance to bending. Hence it is difficult to roll up the head tightly enough to insert it in the tool and this difficulty is accentuated by cold weather which increases the resistance of the plastic to bending.

SUMMARY OF THE INVENTION

The tool of the present invention overcomes the difficulty mentioned above and provides a simple and reliable tag insertion means which is easy to load and as simple to use as the previous tool.

Generally stated, the tool includes a slender elongate shank and a first sleeve surrounding the forward portion of the shank, the two being united and provided with a piercing point, together with a second sleeve serving as a handle and slidably mounted on the rearward portion of the shank. The entire tool may be made of strong rigid plastic such as nylon or a polycarbonate, or various suitable resins. However, it is presently preferred to make the tool of metal, and in the preferred form the shank and a laterally enlarged piercing head with a sharp point are integrally formed by punching from a piece of flat sheet metal such as stainless steel. The first sleeve, which is much shorter than the shank, is placed over the shank, its forward end is flattened to conform to the aft end of the head and is positioned in overlapping relation with the aft end of the head, and is then rigidly secured, as by soldering or welding. The sleeve is coaxial with the shank and defines a chamber between them opening rearward to define a pocket.

The second sleeve is also formed of metal such as stainless steel and is smaller in diameter than the first sleeve so that it may telescope loosely therein. It is also much longer than the first sleeve, the proportion being about three to one. The second sleeve is slipped over the shank and its major intermediate portion is flattened to lie in sliding engagement with the rearward portion of the shank. The aft end of the shank has been previously deformed to produce a rigid detent which engages the flattened portion of the second sleeve and prevents its removal. Finally, the extreme aft end of the second sleeve is flattened and pinched closed to define a pocket which rides freely over the detent. The parts are so proportioned that when the detent stops rearward movement of the second sleeve, its forward end is spaced rearward of the aft end of the first sleeve a short distance, which may be about one half inch, to provide access for the anchoring head to enter the first sleeve. Contact of the aft end of the pocket with the detent limits the forward movement to a position in which the forward end of the second sleeve is about one quarter inch within the first sleeve to lock the anchoring head in position for the piercing operation.

To carry out the operation, the second sleeve is retracted to its rearmost position, the anchoring head is folded about the shank and the forward end of the second sleeve, and the foremost portion of the anchoring head is pushed into the pocket of the first sleeve by the thumb and finger of the operator as far as it will move readily. The second sleeve is then pushed forward, engaging a midportion of the anchoring head and moving the head farther into the pocket. When the detent stops further movement, the sleeves are slightly telescoped and the head is held firmly in place.

The second sleeve, serving as a handle, is gripped firmly and pushed forward to cause the piercing point to form an incision in the ear and is moved farther forward until the anchoring head is completely on the remote side. At this point the first sleeve is gripped and pulled forward with respect to the second sleeve. This releases the anchoring head, and the wings extend to lock the tag in position. Continued pulling draws the entire tool through the incision. The tag is prevented from being pulled through the ear by the body thereof which is larger than the incision.

While the initial form of the sleeves may be oval, square, or other shapes, the cylindrical shape is preferred because conventional round tubing is less expensive and more readily available.

BRIEF DESCRIPTION OF THE DRAWINGS

Various other advantages and features of novelty will become apparent as the description proceeds in conjunction with the accompanying drawings, in which:

FIG. 1 is a perspective view of the tag to be inserted by the tool of the invention;

FIG. 2 is a perspective view of the head of an animal having the tag inserted in its ear;

FIG. 3 is a plan view of the shank and integral piercing head;

FIG. 4 is a view similar to FIG. 3 with the first sleeve fastened in position;

FIG. 5 is a view similar to FIG. 4, with the second sleeve mounted in position;

FIG. 6 is a perspective view of the complete tool with the foremost portion of the anchoring head inserted in the pocket;

FIG. 7 is a view similar to FIG. 6 with the second sleeve securing the anchoring head in place;

FIG. 8 is a view similar to FIG. 7 with the operator's hand gripping the tool just prior to insertion;

FIG. 9 is a plan view of the loaded tool about to make the incision;

FIG. 10 is a view similar to FIG. 9 with the anchoring head on the remote side of the animal's ear; and FIG. 11 is a view similar to FIG. 10 with the anchoring head released and the tool being withdrawn.

DESCRIPTION OF PREFERRED EMBODIMENTS

The novel insertion tool is particularly adapted for use with a tag 10 of the type shown in FIG. 1, in which the tag comprises a generally flat sheet of rubber-like elastomeric material such as polyurethane. It may be stamped or molded to form a laterally extensive panel 12 adapted to bear indicia 14, a narrow neck 16, and an anchoring head 18 with the general planform of an arrow head having a narrow leading end 20 which may be rounded, and rearwardly diverging wings 22 which define detent shoulders 24 at the forward end of the neck. The tag may be entirely coplanar or molded to produce a permanent reverse bend in the neck as illustrated. In FIG. 2 an animal 26 is shown with the tag inserted in its ear 28 with panel 12 hanging generally vertically in front to display the indicia 14, the narrow neck 16 passing through the ear, and the anchoring head 18, not shown, in the rear with the wings 22 deployed to prevent removal.

The primary element of the tool is shown in FIG. 3 in which a slender elongate shank 30 is provided at its forward end 32 with a piercing head 34 having the general planform of an arrow head, with a sharp piercing point 36, sharp side edges 38, and shoulders 40 to define a boss 42 narrower than the main part of the head. The shank and head are punched out of a single piece of sheet metal such as stainless steel to produce an integral construction. The extreme aft end 44 of the shank is deformed to provide a rigid dome-like detent 46 for a purpose to be described later, and the forward portion of the shank is deformed to provide an elongate head or section 48 of generally arcuate cross section to increase the rigidity of that portion.

Considering FIG. 4, a first sleeve 50 is slipped over the aft end of the shank and moved up to the forward end. The initial cross section may be oval or square or other shape but is preferably cylindrical for ready availability and lower cost. The sleeve is preferably stainless steel like the shank to produce a uniform product. The interior of the sleeve is substantially larger than the shank to define a generally annular chamber 52 opening rearwardly at its aft end 54 to serve as a pocket for the reception of the leading end of the tag, and the sleeve is about one third the length of the shank. To fix the sleeve rigidly to the head, its forward end 56 is squeezed between compression jaws to flatten it and it is then moved into overlapping relation with boss 42. The sleeve is positioned substantially coaxially with the shank, and forward end 56 is then permanently united to the head by soldering or welding. It will be noted that the aft portion of sleeve 50 is flared to diverge rearward to insure proper telescoping and binding action of the second sleeve.

After sleeve 50 is properly secured, second sleeve 58 is slipped onto the shank to the position shown in FIG. 5. It is also preferably stainless steel and is smaller in diameter than sleeve 50 so that it will telescope freely. It is about three times as long as the first sleeve and surrounds the major rearward portion of the shank to serve the dual purpose of a handle and a securing means for the tag. When sleeve 58 is in place, its major intermediate or midportion 60 is squeezed between compression jaws to flatten it into loose sliding engagement with the flat portion of the shank, and its extreme aft end 62 is squeezed shut to leave a generally cylindrical closed pocket 64 between it and midportion 60 loosely surrounding detent 46. In the position of FIG. 5, the detent is in engagement with the forward end of the pocket and prevents disengagement of the sleeve from the shank, and also limits the retracting movement of the sleeve so that its forward end 66 is spaced the desired distance of about one half inch from the aft end 54 of the first sleeve. When sleeve 58 is slid forward, the detent contacts the aft end of pocket 64 to limit penetration of end 66 into end 54 to about one quarter inch.

FIGS. 6, 7, and 8 illustrate the sequence of operations in loading the tag into the tool. With sleeve 58 fully retracted, the operator folds head 18 along a fore and aft axis about shank 30 and loosely about sleeve end 66 and inserts leading end 20 of the anchoring head into the flared pocket at 54, pushing it forward as far as it will move readily. In FIG. 7, sleeve 58 is moved forward to its limit position, and end 66 engages the inner surface of the folded anchoring head. Since the end is relatively sharp and the tag material is yieldable, the end will dig into the material slightly and force the head considerably farther into the pocket where it will be held firmly in place by the frictional effect of its surface and the plug action of end 66 which is now in tightly telescoped position.

In FIG. 8 it will be seen that when the operator grips handle or sleeve 58 his thumb 68 will be positioned on slope 70 of the sleeve which serves as a thumb rest, and panel 12 lies against the outer side of his thumb. When he drives the tool through the animal's ear, his thumb will then serve as a stop to limit the extent of the initial movement.

FIGS. 9, 10, and 11 illustrate the phases of the piercing and anchoring operation. In FIG. 9, the tool is in loaded condition as shown in FIG. 8, with the piercing point 36 about to contact an intermediate portion of ear 28. In FIG. 10 the tool has been driven forward until the entire anchoring head 18 has progressed to the remote side of the ear. However, head 18 is still locked in the pocket of sleeve 50 and wings 22 are still folded about sleeve 58. At this time the operator releases his grip on sleeve 58 and grips sleeve 50 to pull it forward with respect to sleeve 58. This movement releases head 18 and the operator continues to pull forward on sleeve 50 while panel 12 prevents forward movement of the tag. As sleeve 50 is pulled away from head 18, wings 22 extend into their original flat configuration as shown in FIG. 11 and the tag is locked in its service position. The continued pull on sleeve 50 draws the entire tool through the incision to clear the ear and the operation is completed.

What is claimed is:

1. A tag inserting tool for use in combination with a tag of generally flat resilient material formed with a laterally extensive marking panel, a narrow neck connected at its aft end to the forward end of the panel, and an anchoring head connected at its aft end to the forward end of the neck and provided with a narrow leading end and rearwardly diverging wings defining detent shoulders at the forward end of the neck, the tool comprising:

a slender elongate shank having an enlarged flat piercing head at the forward end and having an aft end, and a first sleeve having a forward flattened end and an aft end and being substantially larger than the shank and surrounding the latter in overlapping condition to form a generally annular chamber between the shank and the inner wall of the sleeve;

the forward ends of the sleeve and shank being permanently connected and the enlarged head of said shank being provided with a piercing point to pierce the element to be tagged, and the aft end of the sleeve terminating intermediate the length of the shank and opening rearward to define the chamber as an elongate pocket around the shank to receive at least the foremost portion of the leading end of the anchoring head folded about the shank;

and a second sleeve slidably mounted on the rearward portion of the shank and having a forward end of lesser diameter than the aft end of the first sleeve to enable it to slide thereinto in overlapping relation; and the forward end of the second sleeve being axially movable to engage within the folded midportion of the leading end of the anchoring head, force it forward into the pocket, and maintain it in binding relation therein during the piercing of the element to be tagged.

2. A tool, as claimed in claim 1, in which:
  the piercing head and the shank are formed of an integral piece of flat sheet metal, with the major rearward portion of the shank being flat and a minor forward portion being generally arcuate in cross section to increase its rigidity.

3. A tool, as claimed in claim 1, in which:
  interengaging detent means is provided between the second sleeve and the shank to prevent disengagement of the sleeve from the shank.

4. A tool, as claimed in claim 3, in which:
  rigid detent means is formed on the aft end of the shank in position to engage with a portion of the sleeve.

5. A tool, as claimed in claim 1, in which:
  at least the major rearward portion of the shank is flat and an intermediate portion of the second sleeve has a flattened form to encompass the shank in sliding relation.

6. A tool, as claimed in claim 5, in which:
  a short aft portion of the second sleeve is generally cylindrical and overlies the aft end of the shank;
  and a rigid detent is formed on the aft end of the shank and lies within the aft portion of the sleeve to engage the flattened intermediate portion of the sleeve and prevent its separation from the shank.

7. A tool, as claimed in claim 6, in which:
  the extreme aft end of the second sleeve has a flattened form to engage the detent and limit the extent of forward movement of the sleeve.

* * * * *